(12) United States Patent
Sudha et al.

(10) Patent No.: US 7,892,588 B1
(45) Date of Patent: Feb. 22, 2011

(54) LOW-FAT-LOW-SUGAR SOFT DOUGH BISCUIT AND A PROCESS FOR PREPARATION THEREOF

(75) Inventors: Madhugiri Lakshminarayan Sudha, Mysore (IN); Rathinam Vetrimani, Mysore (IN); Alok Kumar Srivastava, Mysore (IN); Krishna Rau Leelavathi, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 741 days.

(21) Appl. No.: 10/403,430

(22) Filed: Mar. 31, 2003

(51) Int. Cl.
*A21D 13/00* (2006.01)

(52) U.S. Cl. ............... 426/549; 426/496; 426/551

(58) Field of Classification Search ............ None
See application file for complete search history.

(56) References Cited

U.S. PATENT DOCUMENTS

| 4,228,198 | A | * | 10/1980 | Burge et al. ............ 426/548 |
| 4,668,519 | A | * | 5/1987 | Dartey et al. ............ 426/548 |
| 5,133,984 | A | * | 7/1992 | Murphy et al. ............ 426/496 |
| 5,492,710 | A | * | 2/1996 | Seyam ............ 426/550 |
| 5,514,404 | A | * | 5/1996 | Zimmerman et al. ............ 426/549 |
| 6,291,005 | B1 | * | 9/2001 | Fuchs et al. ............ 426/549 |
| 6,436,458 | B2 | * | 8/2002 | Kuechle et al. ............ 426/128 |
| 6,830,770 | B1 | * | 12/2004 | Kilibwa ............ 426/549 |
| 7,138,154 | B2 | * | 11/2006 | Brendel et al. ............ 426/548 |

\* cited by examiner

*Primary Examiner*—Lien Tran
(74) *Attorney, Agent, or Firm*—Abelman, Frayne & Schwab

(57) ABSTRACT

A low-fat, low-sugar biscuit is provided which includes 65 to 90%, by weight, wheat flour, 3 to 7%, by weight of cereal fillers, 5 to 20%, by weight, of maltodextrin, 5 to 20%, by weight, of sugar, 3 to 10%, by weight, of fat, 0.1 to 0.5%, by weight, of a hydrocolloid, 0.1 to 2.0%, by weight, of emulsifiers, with the remainder being flavoring agents, food grade additives and food preservatives and for process of preparing same.

6 Claims, 1 Drawing Sheet

Figure 1

FLOW CHART

Blending of refined wheat flour, cereal fiber, and skimmed milk powder

Creaming (14 – 21 minutes)
(fat, sugar powder, maltodextrin, glycerol mono stearate, polysorbate 60, guar gum, liquid glucose, flavoring agents)

Mixing (6 – 11 minutes)
(sodium chloride, sodium bicarbonate, ammonium bicarbonate, sodium meta bisulfite. All ingredients suspended in water and mixed with the above cream)

Mixing (2 – 4 minutes)
(add 5 – 10% of wheat flour-cereal fiber- skimmed milk powder blend to the above cream and mix)

Dough mixing (6 – 11 minutes)
(add remaining [85 – 90%] wheat flour-cereal fiber- skimmed milk powder blend to the above cream and mix)

Sheeting and moulding of biscuit dough
(Rotary moulder)

Baking (4 – 6 minutes; 150 - 260°C)

Cooling (30 – 45 minutes)

Packing

LOW-FAT-LOW-SUGAR SOFT DOUGH BISCUIT AND A PROCESS FOR PREPARATION THEREOF

FIELD OF THE INVENTION

The present invention relates to a novel low-fat, low-sugar soft dough biscuit comprising a bulking agent such as maltodextrin, a source of fiber, a hydrocolloid, a reducing agent and emulsifiers and a process for preparing the low-fat, low-sugar soft dough biscuits.

BACKGROUND AND PRIOR ART DESCRIPTION

Biscuit is one of the most popular bakery products and also a popular snack food among all cross sections of population. It is estimated that in India biscuit market is growing at a rate of 10% per year. About 1.2 million metric tons of biscuits are manufactured by both the organized and unorganized sectors in India with an annual turnover of more than 2000 crores (Sharma, H. K., Singh, S. T. M., and Goyal, P. 1998. Bakery Products in Next Millennium. Beverage & Food World, November-December pp 40, 46). Among the processed ready-to-eat convenient products, biscuit has several advantages such as long shelf life, easy availability in different tastes, flavour and texture and hence preferred by all cross section of population.

Soft-dough or gluco-type biscuits contain a reasonably high amount of both fat and sugar in their formulation. As a food component, fat contributes key sensory and physiological benefits. Fat contributes to flavor, or the combined perception of mouthfeel, taste, aroma and odour (Casimir C.Akoh. 1998. Fat replacers. Food Technology. 52(3): 47-53). Fat also contributes to creaminess, appearance, palatability, texture, and lubricity of bakery goods. Fat is also the most concentrated source of energy in the diet, providing 9 kcal/g compared to 4 kcal/g for proteins and carbohydrates.

High intake of fat is associated with increased risk for obesity and cancer. Intake of saturated fat is associated with high blood cholesterol and coronary heart disease (D. K. Sandrou and I. S. Arvanitoyannis. 2000. Low-Fat/Calorie Foods: Current State and Perspectives. Critical Reviews in Food Science and Nutrition. 40(5):427-447).

Along with fat, sugar controls the palatability of biscuits. The most commonly used sugar in the biscuit formulation is sucrose. Sugar imparts sweet taste to the biscuits. Sugar provides bulk, participates in browning reaction, and affects spread, crispness and surface characteristics of biscuits. Along with fat sugar imparts aeration to the product. Consumers sometimes require products low sugar to control body weight and health problems such as diabetes and hypoglycemia (D. K. Sandrou and I. S. Arvanitoyannis. 2000. Low-Fat/Calorie Foods: Current State and Perspectives. Critical Reviews in Food Science and Nutrition. 40(5):427-447).

Awareness of adverse effects of excessive dietary fat intake is virtually universal. Consequently, health conscious individuals are modifying their dietary habits and eating less fat (G. D. Miller and S. M. Groziak. 1996. Impact of fat substitutes on fat intake. Lipids. 31 (S):273-277). Consumer acceptance of any food product depends upon taste which is the most important sensory attribute. Although consumers want foods with minimal to no fat or calories, they also want the foods to taste good.

Nearly 50-55% of the total biscuits produced in India belong to the sweet 'gluco-type' biscuits manufactured from soft dough. Commonly soft dough biscuits have a fat content around 20-25% and sugar content of 25-30%.

Reference may be made to E. L. Zimmerman, J. M. Carey, L. Slade and H. Levine (U.S. Pat. No. 5,514,404) wherein tenderized baked good production with reduced fat, no fat, or no added fat is prepared. The drawback is the products have tender or soft texture which is not desirable in a biscuit.

Reference may be made to L. M. Bullock, A. P. Handel, S. Segall, and P. A. Wasseramn, 1992, Food Technology, 46 (1): 82, 84, 86, wherein cookies containing no added simple sugars were developed. The drawback is the use of 'acesulfame-k', a high intensity non-nutritive sweetener, use of which might not be allowed in bakery products in several parts of the world, including India.

Reference may be made to Emmanuel I. Zoulias, Spyros Piknis and Vassiliki Oreopoulou, 2000, Journal of the Science of Food and Agriculture, 80:2049-2056 wherein cookies were produced using polydextrose to replace 35% of formula fat and formula sugar was replaced with polyols and acesulfame-k. The drawback is the use of acesulfame-k, an artificial sweetener, use of which might not be allowed in bakery products in many countries in the world, including India.

Reference may be made to Ruthann B. Swanson, Lou Ann Carden and Sheryul S. Parks, 1999, Journal of Food Quality, 22 (1): 19-29 wherein reduced-fat peanut butter cookies were made using 'oatrim'—a commercially available fat-replacer and emulsifiers. The drawback is that addition of 'oatrim' decreased the optimum hardness and brittleness of cookies.

Reference may be made to L. A. Campbell, S. M. Ketelsen, and R. N. Antennucci, 1994, Food Technology, 47:98 102-105 wherein oatmeal cookies were prepared using certain calorie-sparing ingredients. The drawback is the use of whole eggs which might not be suitable for all stratum of population.

Reference may be made to M. Adair, S. Knight and G. Gates, 2001, Journal of the American Dietetics Association, 101 (4): 467-469 wherein peanut butter cookies were made using mungbean paste as a fat substitute. The drawbacks were incorporation of mungbean paste which reduced cookie spread and adversely affected the acceptability of the product.

Reference may be made to O. Charlton and M. K. Sawyer-Morse, 1996, Journal of the American Dietetics Association, 96(12) 1288-1290, wherein chocolate chip cookies were made reducing their fat content. The drawback was that the fat in cookie formulation was replaced with three commercially available fat-substitute preparations and these cookies gave lower sensory scores than control cookies.

OBJECTS OF THE PRESENT INVENTION

The main object of the present invention is to provide low-fat, low-sugar dough biscuits and a process for the preparation thereof.

Another object of the present invention is to reduce the fat content and sugar content in the soft dough biscuit formulation.

Yet another object of the present invention is to use a bulking agent such as maltodextrin to replace fat and sugar in the soft dough biscuit formulation.

Still another object of the present invention is to provide a biscuit wherein some part of the refined wheat flour is replaced with fiber from cereals such as oat, barley or wheat.

Yet another object of the present invention is to use a combination of two emulsifiers to improve the overall quality and texture of biscuits containing reduced fat level.

Yet another object of the present invention is to use a hydrocolloid such as guar gum to improve the texture of low-fat-low-sugar biscuits.

Still another object of the present invention is to use a reducing agent such as sodium meta bisulfite to help in maintaining the spread and in improving the texture of the biscuits containing reduced fat and reduced sugar levels.

SUMMARY OF THE INVENTION

The present invention provides a low-fat, low-sugar biscuit comprising 65 to 90% by wt. wheat flour, 3 to 7% by wt. of cereal fibers, 5 to 20% by wt. of maltodextrin, 5 to 20% by wt. of sugar, 3 to 10% by wt. of fat, 0.1 to 0.5% by wt. of hydrocolloid, 0.1 to 2.0% by wt. of emulsifiers and the rest being flavoring agents, food grade additives and food preservatives and a process for preparing the same.

DETAILED DESCRIPTION OF THE PRESENT INVENTION

Accordingly, the present invention provides a low-fat, low-sugar biscuit comprising 65 to 90% by wt. wheat flour, 3 to 7% by wt. of cereal fibers, 5 to 20% by wt. of maltodextrin, 5 to 20% by wt. of sugar, 3 to 10% by wt. of fat, 0.1 to 0.5% by wt. of hydrocolloid, 0.1 to 2.0% by wt. of emulsifiers and the rest being flavoring agents, food grade additives and food preservatives.

In an embodiment of the present invention, the wheat flour is commercially available refined wheat flour.

In another embodiment of the present invention, the wheat flour contains 10.0-12.0% moisture; 0.40-0.50% ash; 8.0-9.0% dry gluten; 11.0-13.0% protein and 390-490s Falling Number value.

In yet another embodiment of the present invention, the cereal fibers are selected from oat, barley and wheat.

In still another embodiment of the present invention, the hydrocolloid used is guar gum.

In one more embodiment of the present invention, the emulsifiers used are selected from a mixture of glycerol mono stearate and Polysorbate 60.

In one another embodiment of the present invention, the food grade additives includes skimmed powder milk, sodium meta bisulfite and liquid glucose.

In a further embodiment of the present invention, the flavoring agent includes sodium chloride and also other flavoring agents conforming to Prevention of Food Adulteration Act.

In an embodiment of the present invention, the preservatives include sodium bicarbonate, ammonium bicarbonate and other food grade preservatives.

The present invention particularly provides a low-fat, low-sugar biscuit which comprises of:

| MATERIAL | QUANTITY (KG) |
| --- | --- |
| Refined wheat flour (70-72% extraction) | 85-100 |
| Cereal fiber | 5-10 |
| Sugar powder (+160u sieve) | 12-17 |
| Fat (Bakery; M.P. 40° C.) | 4-10 |
| Maltodextrin (Food grade; DE 25-27) | 16-10 |
| Guar gum (Food grade) | 0.1-0.3 |
| Glycerol mono stearate (Food grade) | 0.3-0.5 |
| Polysorbate 60 (Food grade) | 0.05-0.15 |
| Skimmed milk powder (fat content <1%) | 1.0-4.0 |
| Sodium meta bisulfite (Food grade) | 0.003-0.006 |
| Sodium Chloride (Food grade; noniodized) | 0.2-0.6 |
| Sodium bicarbonate (Food grade) | 0.2-0.6 |
| Ammonium bicarbonate (Food grade) | 1.0-1.8 |
| Liquid glucose (Food grade) | 1.0-4.0 |
| Flavoring agents (conforming to Prevention of Food Adulteration Act) | 1.0-4.0 |

The present invention more particularly provides a biscuit which comprises of:

| MATERIAL | QUANTITY (KG) |
| --- | --- |
| Refined wheat flour (70-72% extraction) | 95.0 |
| Cereal fiber | 5.0 |
| Sugar powder (+160μ sieve) | 15.0 |
| Fat (Bakery; M.P. 40° C.) | 6.0 |
| Guar gum (Food grade) | 0.2 |
| Glycerol mono stearate (Food grade) | 0.4 |
| Polysorbate 60 (Food grade) | 0.1 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

The present invention also provides a process preparing a low-fat, low-sugar soft dough biscuit, said process comprising the steps of mixing 65 to 90% by wt. wheat flour, 3 to 7% by wt. of cereal fibers, 5 to 20% by wt. of maltodextrin, 5 to 20% by wt. of sugar, 3 to 10% by wt. of fat, 0.1 to 0.5% by wt. of hydrocolloid, 0.1 to 2.0% by wt. of emulsifiers and the rest being flavoring agents, food grade additives and food preservatives to obtain a smooth creamy biscuit dough, shaping the biscuit dough thus obtained and baking the same to get the low-fat, low-sugar soft biscuit.

More particularly, the present invention provides a process preparing a low-fat, low-sugar soft dough biscuit, said process comprising the steps of:

(i) creaming by conventional method, fat 5-10% by weight of flour, maltodextrin 10-20% by weight of flour made into a paste using water 2-4% by weight of flour, guar gum 0.1-0.4% by weight of flour made into a gel using water 1-4% by weight of flour, glycerol mono stearate 0.1-0.4% by weight of flour made into a paste using water 1-4% by weight of flour, polysorbate 60 0.1-0.4% by weight of flour, sugar powder 12-17% by weight of flour, flavoring agent, liquid glucose conforming to flavor and color, for a period of 14-21 minutes;

(ii) preparing a solution of sodium chloride, sodium bicarbonate, ammonium bicarbonate and sodium meta bisulfite in water and mixing with the cream of step (i) for a period of 5-10 minutes;

(iii) preparing a homogenous blend of refined wheat flour, cereal fiber and skimmed milk powder;

(iv) adding 5-10% of the homogeneous blend of step (iii) to the cream of step (ii) and mixing the same for 2-4 minutes to obtain a smooth creamy paste;

(v) mixing the remaining blend from step (iii) with the creamy paste of step (iv) for 4-6 minutes to get the biscuit dough, and (vi) shaping the biscuit dough and baking the same to get the low-fat, low-sugar soft dough biscuits.

In an embodiment of the present invention, the wheat flour is commercially available refined wheat flour.

In another embodiment of the present invention, the wheat flour contains 10.0-12.0% moisture; 0.40-0.50% ash; 8.0-9.0% dry gluten; 11.0-13.0% protein and 390-490s Falling Number value.

In yet another embodiment of the present invention, the wheat flour is sieved to remove impurities, provide aeration and homogenization.

In still another embodiment of the present invention, the cereal fibers are selected from oat, barley and wheat.

In one more embodiment of the present invention, wheat flour, cereal fiber and skimmed milk powder are homogenously blended together and the mixture is optionally sieved by passing through sieve 110μ-140μ to obtain uniform mixture.

In one another embodiment of the present invention, maltodextrin is made into a smooth paste using 2-4% water by weight of flour.

In a further embodiment of the present invention, guar gum is made into a gel using 20-30% water by weight of flour.

In another embodiment of the present invention, glycerol mono stearate is made into a paste using 1-4% water by weight of flour.

In yet another embodiment of the present invention, bakery fat, sugar powder, maltodextrin paste, guar gum gel, glycerol mono stearate paste, polysorbate 60, liquid glucose and flavoring agents are creamed in a horizontal or vertical mixer at an rpm of 61-178 for 14-20 minutes so as to thoroughly blend the components and aerate the mixture.

In still another embodiment of the present invention, sodium chloride, sodium bicarbonate, ammonium bicarbonate and sodium meta bisulfite are dissolved in water and added to the above cream, and the mixture is mixed for 6-11 minutes using a horizontal or vertical mixer at an rpm of 61-178 to obtain a uniform consistency homogenous cream.

In one more embodiment of the present invention, 5-10% of wheat flour-cereal fiber-skimmed milk powder blend is added to the homogeneous cream and mixed for 2-4 minutes to obtain a homogenous smooth paste.

In one another embodiment of the present invention, the remaining wheat flour-cereal fiber-skimmed milk powder blend is added to the homogeneous smooth paste and mixed for 6-11 minutes to obtain homogenous dough.

In a further embodiment of the present invention, the shaping of the dough is performed by sheeting and moulding.

In another embodiment of the present invention, the dough is sheeted and molded using a rotary biscuit moulder using a circular die of about 4.5 mm diameter.

In yet another embodiment of the present invention, the molded biscuit dough is baked in a continuous tunnel type oven at temperature ranging from 150-260° C. for 4-6 minutes baking time.

In still another embodiment of the present invention, baked biscuits are cooled at room temperature (28°-30° C.) for a period of 30-45 minutes at a cooling rate of 2.5-3.0° per minute.

In a further embodiment of the present invention biscuits are either bulk packed in High Density polyethylene (HDPE) or in small unit packs in HDPE or Biaxilary Oriented Poly Propylene (BOPP).

Following formulation in the range with alterations wherever required was used for the preparation of low-fat-low-sugar soft dough biscuits.

| MATERIAL | QUANTITY (KG) |
|---|---|
| Refined wheat flour (70-72% extraction) | 85-100 |
| Cereal fiber | 5-10 |
| Sugar powder (+160u sieve) | 12-17 |
| Fat (Bakery; M.P. 40° C.) | 4-10 |
| Maltodextrin (Food grade; DE 25-27) | 16-10 |
| Guar gum (Food grade) | 0.1-0.3 |
| Glycerol mono stearate (Food grade) | 0.3-0.5 |
| Polysorbate 60 (Food grade) | 0.05-0.15 |
| Skimmed milk powder (fat content <1%) | 1.0-4.0 |
| Sodium meta bisulfite (Food grade) | 0.003-0.006 |
| Sodium Chloride (Food grade; noniodized) | 0.2-0.6 |
| Sodium bicarbonate (Food grade) | 0.2-0.6 |
| Ammonium bicarbonate (Food grade) | 1.0-1.8 |
| Liquid glucose (Food grade) | 1.0-4.0 |
| Flavoring agents | 1.0-4.0 |
| Total dry matter (kg) | 126.9-163.1 |
| Moisture in biscuits (kg) | 5.0-5.0 |
| | 131.9-168.1 |
| Production Loss (0.5%; kg) | 0.66-0.84 |
| Production loss due to aerating agents (0.75%; kg) | 0.91-1.26 |
| Process deficit (0.5%; kg) | 0.66-0.84 |
| | 2.23-2.94 |
| | 129.67-165.16 |
| Yield of biscuits per 100 kg flour = 129.7-165.2 Kg | |

The different unit operations and conditions involved in the preparation of low-fat, low-sugar soft dough biscuits using lowered fat and lowered sugar contents, maltodextrin and the two emulsifiers, namely, glycerol mono stearate and polysorbate 60 and a hydrocolloid namely, guar gum, can be seen in the flow chart set forth in FIG. 1.

[FLOW CHART

Blending of refined wheat flour, cereal fiber, and skimmed milk powder

↓

Creaming (14-21 minutes)
(fat, sugar powder, maltodextrin, glycerol mono stearate, polysorbate 60, guar gum, liquid glucose, flavoring agents)

↓

Mixing (6-11 minutes)
(sodium chloride, sodium bicarbonate, ammonium bicarbonate, sodium meta bisulfite. All ingredients suspended in water and mixed with the above cream)

↓

Mixing (2-4 minutes)
(add 5-10% of wheat flour-cereal fiber-skimmed milk powder blend to the above cream mix)

↓

-continued

Dough mixing (6-11 minutes)
(add remaining [85-90%] wheat flour-cereal fiber-skimmed milk powder
blend to the above cream and mix)

↓

Sheeting and moulding of biscuit dough
(Rotary moulder)

↓

Baking (4-6 minutes; 150-260° C.)

↓

Cooling (30-45 minutes)

↓

Packing]

The following examples are given by way of illustration and therefore should not be construed to limit the scope of the present invention in any manner.

EXAMPLE—1

In the present example biscuits were prepared without the addition of maltodextrin in the formulation. Ingredients and the quantity used in the following example are given below. Biscuits were prepared as in the flow chart.

| MATERIAL | QUANTITY (KG) |
|---|---|
| Refined wheat flour (70-72% extraction) | 95.0 |
| Cereal fiber | 5.0 |
| Sugar powder (+160µ sieve) | 15.0 |
| Fat (Bakery; M.P. 40° C.) | 6.0 |
| Guar gum (Food grade) | 0.2 |
| Glycerol mono stearate (Food grade) | 0.4 |
| Polysorbate 60 (Food grade) | 0.1 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

| Physical characteristics of biscuits | | | | |
|---|---|---|---|---|
| Weight (g) | Width (cm) | Thickness (cm) | Spread ratio (W/T) | Texture (kg, Force) |
| 6.9 | 5.2 | 0.33 | 15.8 | 2.3 |

Evaluation of the physical properties of the biscuits showed that the width of the biscuit was 5.2 cm and the thickness of the biscuit was 0.33 cm. The spread ratio of the biscuit was 15.8. The weight of the biscuit was 6.9 g. The objective measurement of the texture showed that the biscuit had a breaking strength of 2.3 kg.

The subjective evaluation of the biscuits showed that the biscuits had a non-uniform surface with a shrunken appearance. The biscuits were dull brown in colour. The biscuits also had hollow and flaky interior, and had separated layers. The biscuits were fragile, very easy to break. The biscuits were very crumbly and powdery while eating.

EXAMPLE—2

In the present example, biscuits were prepared without the addition of glycerol mono stearate in the formulation. Ingredients and the quantity used in the following example are given below. Biscuits were prepared as in the flow chart.

| MATERIAL | QUANTITY (KG) |
|---|---|
| Refined wheat flour (70-72% extraction) | 95.0 |
| Cereal fiber | 5.0 |
| Sugar powder (+160µ sieve) | 15.0 |
| Fat (Bakery; M.P. 40° C.) | 6.0 |
| Maltodextrin (Food grade; DE 25-27) | 14.0 |
| Guar gum (Food grade) | 0.2 |
| Polysorbate 60 (Food grade) | 0.1 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

| Physical characteristics of biscuits | | | | |
|---|---|---|---|---|
| Weight (g) | Width (cm) | Thickness (cm) | Spread ratio (W/T) | Texture (kg, Force) |
| 6.2 | 5.3 | 0.25 | 21.2 | 2.4 |

Evaluation of the physical properties of the biscuits showed that the width of the biscuit was 5.3 cm and the thickness of the biscuit was 0.25 cm. The spread ratio of the biscuit was 21.2. The weight of the biscuit was 6.2 g. The objective measurement of the texture showed that the biscuit had a breaking strength of 2.4 kg.

The subjective evaluation showed that the biscuits had uniform brown colour, compact and non porous crumb structure. Fine checking was seen on the surface of the biscuits. The biscuits had slightly sticky mouthfeel.

EXAMPLE—3

In the present example, biscuits were prepared without the addition of polysorbate 60 in the Ingredients and the quantity used in the following example are given below. Biscuits were prepared as in the flow chart.

| INGREDIENT | QUANTITY (G) |
|---|---|
| Refined wheat flour (70-72% extraction) | 95.0 |
| Cereal fiber | 5.0 |
| Sugar powder (+160µ sieve) | 15.0 |
| Fat (Bakery; M.P. 40° C.) | 6.0 |
| Maltodextrin (Food grade; DE 25-27) | 14.0 |
| Glycerol mono stearate (Food grade) | 0.40 |
| Guar gum (Food grade) | 0.2 |
| Skimmed milk powder (fat content <1%) | 2.0 |

-continued

| | |
|---|---|
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

Physical characteristics of biscuits

| Weight (g) | Width (cm) | Thickness (cm) | Spread ratio (W/T) | Texture (kg, Force) |
|---|---|---|---|---|
| 6.6 | 5.4 | 0.26 | 20.8 | 2.4 |

Evaluation of the physical properties of the biscuits showed that the width of the biscuit was 5.4 cm and the thickness of the biscuit was 0.26 cm. The spread ratio of the biscuit was 20.8. The weight of the biscuit was 6.6 g. The objective measurement of the texture showed that the biscuit had a breaking strength of 2.4 kg.

The subjective analysis of biscuits showed that the biscuits had uneven surface, shrunken appearance. The biscuits had relatively dense and compact crumb structure and had slightly sticky mouthfeel.

EXAMPLE—4

In the present example, biscuits were prepared without the addition of guar gum in the formulation. Ingredients and the quantity used in the following example are given below. Biscuits were prepared as in the flow chart.

| INGREDIENT | QUANTITY (G) |
|---|---|
| Refined wheat flour (70-72% extraction) | 95.0 |
| Cereal fiber | 5.0 |
| Sugar powder (+160μ sieve) | 15.0 |
| Fat (Bakery; M.P. 40° C.) | 6.0 |
| Maltodextrin (Food grade; DE 25-27) | 14.0 |
| Glycerol mono stearate (Food grade) | 0.40 |
| Polysorbate 60 (Food grade) | 0.10 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

Physical characteristics of biscuits

| Weight (g) | Width (cm) | Thickness (cm) | Spread ratio (W/T) | Texture (kg, Force) |
|---|---|---|---|---|
| 6.4 | 5.3 | 0.26 | 20.4 | 2.6 |

Evaluation of the physical properties of the biscuits showed that the width of the biscuit was 5.3 cm and the thickness of the biscuit was 0.26 cm. The spread ratio of the biscuit was 20.4. The weight of the biscuit was 6.4 g. The objective measurement of the texture showed that the biscuit had a breaking strength of 2.6 kg.

Subjective evaluation showed that biscuits had smooth surface with uniform brown colour. The biscuits had relatively hard texture and a dry mouth feel.

EXAMPLE—5

In the present example, biscuits were prepared without the addition of sodium meta bisulfite in the formulation. Ingredients and the quantity used in the following example are given below. Biscuits were prepared as in the flow chart.

| INGREDIENT | QUANTITY (G) |
|---|---|
| Refined wheat flour (70-72% extraction) | 95.0 |
| Cereal fiber | 5.0 |
| Sugar powder (+160μ sieve) | 15.0 |
| Fat (Bakery; M.P. 40° C.) | 6.0 |
| Maltodextrin (Food grade; DE 25-27) | 14.0 |
| Glycerol mono stearate (Food grade) | 0.40 |
| Polysorbate 60 (Food grade) | 0.10 |
| Guar gum (Food grade) | 0.2 |
| Skimmed milk powder (fat content <1%) | 2.0 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

Physical characteristics of biscuits

| Weight (g) | Width (cm) | Thickness (cm) | Spread ratio (W/T) | Texture (kg, Force) |
|---|---|---|---|---|
| 6.1 | 5.3 | 0.24 | 22.1 | 3.3 |

Evaluation of the physical properties of the biscuits showed that the width of the biscuit was 5.3 cm and the thickness of the biscuit was 0.24 cm. The spread ratio of the biscuit was 22.1. The weight of the biscuit was 6.1 g. The objective measurement of the texture showed that the biscuit had a breaking strength of 3.3 kg.

The subjective evaluation showed that biscuits had smooth surface, uniform brown colour. The biscuits were less crisp and had relatively hard texture.

EXAMPLE—6

The present formulation gives the finalized formulation for the preparation of low-fat-low-sugar biscuits. Ingredients and the quantity used in the following example are given below. Biscuits were prepared as in the flow chart.

| INGREDIENT | QUANTITY (G) |
|---|---|
| Refined wheat flour (70-72% extraction) | 95.0 |
| Cereal fiber | 5.0 |
| Sugar powder (+160μ sieve) | 15.0 |
| Fat (Bakery; M.P. 40° C.) | 6.0 |
| Maltodextrin (Food grade; DE 25-27) | 14.0 |
| Glycerol mono stearate (Food grade) | 0.40 |
| Polysorbate 60 (Food grade) | 0.10 |
| Guar gum (Food grade) | 0.2 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |

-continued

| | |
|---|---|
| Liquid glucose (Food grade) | 2.0 |
| Flavoring agents | 2.0 |

Physical characteristics of biscuits

| Weight (g) | Width (cm) | Thickness (cm) | Spread ratio (W/T) | Texture (kg, Force) |
|---|---|---|---|---|
| 6.2 | 5.4 | 0.27 | 20.0 | 2.2 |

Evaluation of the physical properties of the biscuits showed that the width of the biscuit was 5.4 cm and the thickness of the biscuit was 0.27 cm. The spread ratio of the biscuit was 20.0. The weight of the biscuit was 6.2 g. The objective measurement of the texture showed that the biscuit had a breaking strength of 2.2 kg.

The subjective evaluation showed that the biscuits had uniform brown colour with smooth surface, creamish white crumb. Biscuits had wholesome mouthfeel and did not stick to the mouth while eating. The Biscuits were not crumbly or powdery while eating and had crisp texture and acceptable taste.

EXAMPLE—7

In the present formulation two different mixing methods were used for the preparation of the biscuit dough. Ingredients and the quantity used in the following example are given below. Biscuits were prepared as in the flow chart.

| INGREDIENT | QUANTITY (G) |
|---|---|
| Refined wheat flour (70-72% extraction) | 95.0 |
| Cereal fiber | 5.0 |
| Sugar powder (+160μ sieve) | 15.0 |
| Fat (Bakery; M.P. 40° C.) | 6.0 |
| Maltodextrin (Food grade; DE 25-27) | 14.0 |
| Glycerol mono stearate (Food grade) | 0.40 |
| Polysorbate 60 (Food grade) | 0.10 |
| Guar gum (Food grade) | 0.2 |
| Skimmed milk powder (fat content <1%) | 2.0 |
| Sodium meta bisulfite (Food grade) | 0.005 |
| Sodium Chloride (Food grade; non iodized) | 0.5 |
| Sodium bicarbonate (Food grade) | 0.4 |
| Ammonium bicarbonate (Food grade) | 1.5 |
| Liquid glucose (Food grade) | 2.0 |
| Flavoring agents | 2.0 |

In the present example two mixing methods were followed to prepare the biscuit dough.

In the first experiment all-in-one method was followed for the preparation of the biscuit dough. This involved transferring of all the formula ingredients into the mixer bowl and mixed until a homogenous biscuit dough was formed. The dough was then fed to the rotary moulder followed by baking.

Evaluation of the physical properties of the biscuits showed that it had a width of 5.2 cm and a thickness of 0.29 cm. The objective measurement of the texture showed that the biscuit had a breaking strength of 2.8 Kg.

The subjective evaluation showed that the biscuits had relatively hard texture.

In the second experiment creaming method was followed to prepare the biscuit dough. Fat, sugar powder, maltodextrin paste, glycerol mono stearate paste, polysorbate-60, guar gum gel, liquid glucose and flavour were creamed together. Once a smooth well-aerated cream was formed baking chemicals dissolved in water were transferred to the above cream and mixed further to get a smooth cream. To the above cream 5-10% of flour-fiber-skim milk powder blend was transferred and mixed further to get a smooth homogenous paste. In the presence of low fat level mixing of a small portion of flour-fiber-milk powder blend gave a very smooth creamy paste. To the above cream rest of the flour blend was transferred and mixed to form a homogenous biscuit dough.

The objective evaluation showed that the biscuit had a width of 5.4 cm, thickness of 0.27 cm and breaking strength of 2.2 Kg. The subjective evaluation showed that these biscuits had crisp and acceptable texture.

Low-fat, low-sugar biscuits thus prepared using lowered fat and lowered sugar levels and using maltodextrin, glycerol mono stearate, polysorbate 60, guar gum and sodium meta bisulfite has the following advantages:

1. Formulation of low-fat-low-sugar biscuits contains a 70% reduction in the fat level than normal soft dough biscuits. It can therefore be considered as low-fat biscuit also and can be a health snack food. Analysis of some of the commercial biscuit samples showed that the fat content in their formulations ranged from 10.0%-14.0%. The fat content in the low-fat-low-sugar biscuits was 5.3%.

| Biscuit samples | Fat (on dry basis) (%) |
|---|---|
| Commercial (Range) | 10.0-14.0 |
| Control (Experimental) | 13.9 |
| Low-fat-low-sugar (Experimental) | 5.3 |

2. Formulation of low-fat-low-sugar biscuits also has a 50% reduction in its sugar content than normal soft dough biscuits. Analysis of some of the commercial biscuit samples showed that the non reducing sugar content ranged from 17.5-19.4%. While the non reducing sugar content in the low-fat-low-sugar biscuits was 9.6%.

| Biscuit samples | Reducing sugars (on dry basis) (%) | Non reducing sugars (on dry basis) (%) | Total Sugar (on dry basis) (%) | Calories |
|---|---|---|---|---|
| Commercial (Range) | 2.9-3.8 | 17.5-19.4 | 21-23 | 440-470 |
| Control (Experimental) | 3.0 | 16.0 | 19.0 | 470 |
| Low-fat-low-sugar (Experimental) | 5.4 | 9.6 | 15.0 | 405 |

3. 5% of refined wheat flour has been replaced with a cereal fiber which helped in further reduction of the calorific value of biscuits. The control biscuits had a calorific value of 470 while the low-fat-low-sugar biscuits had a calorific value of 405.

4. Low-fat-low-sugar biscuits contain a well-balanced combination of two emulsifiers namely, glycerol mono stearate and polysorbate 60. Glycerol mono stearate has an HLB value of 3.8 while polysorbate 60 has an HLB value of 14.9. In the absence of limited fat and sugar contents, in the low-fat-low-sugar biscuit formulation, a combination of the above two emulsifiers in the right proportion provide good aeration to the cream.

5. Low-fat-low-sugar biscuits contain an optimum level of guar gum, which impart a wholesome mouthfeel and also has an improving effect on the spread and texture of the biscuits.
6. In the absence of optimum fat and sugar levels in the formulation presence of sodium meta bisulfite has a beneficial effect on the biscuit dough extensibility and provided good spread to low-fat-low-sugar biscuits.
7. In the presence of low fat and low sugar levels creaming method of mixing was found more efficient and produced biscuits with relatively better texture than when all-in-one method of mixing was followed.

We claim:

1. A low-fat, low-sugar biscuit consisting essentially of: 65% to 90% by weight, wheat flour, 3% to 7% by weight, of cereal fibers, 5% to 20%, by weight, of maltodextrin having a DE<25-27, 5% to 20%, by weight, of sugar, 3% to 10%, by weight, of fat, 0.1% to 0.5%, by weight, of a hydrocolloid and 0.1% to 2.0%, by weight, of glycerol monostearate and polysorbate 60.

2. The biscuit of claim 1, wherein the cereal fibers are selected from the group consisting of oat, barley and wheat.

3. The biscuit of claim 1 wherein the total sugar is 15%, by weight.

4. The biscuit of claim 1 wherein the fat content is 5.3%, by weight.

5. The biscuit of claim 1 and including sodium metabisulfite.

6. A low-fat, low-sugar biscuit formulation, which consists of:

| MATERIAL | QUANTITY (G) |
| --- | --- |
| Refined wheat flour 70-72% extraction | 95.0 |
| Cereal fiber | 5.0 |
| Sugar powder +160μ sieve | 15.0 |
| Fat Bakery, MP 40° C. | 6.0 |
| Maltodextrin DE 25-27 | 14.0 |
| Guar gum | 0.2 |
| Glycerol monostearate | 0.40 |
| Polysorbate 60 | 0.10 |
| Skimmed milk powder fat content <1% | 2.0 |
| Sodium meta bisulfite | .005 |
| Sodium chloride (food grade; non-iodized) | 0.5 |
| Sodium bicarbonate (food grade) | 0.4 |
| Ammonium bicarbonate (food grade) | 1.5 |
| Liquid glucose (food grade) | 2.0 |
| Flavoring agents | 2.0. |

* * * * *